March 10, 1925.
F. PURDY ET AL
1,528,786
CONTROLLING MEANS FOR CIRCULATING SYSTEMS
Filed May 12, 1921
3 Sheets-Sheet 1
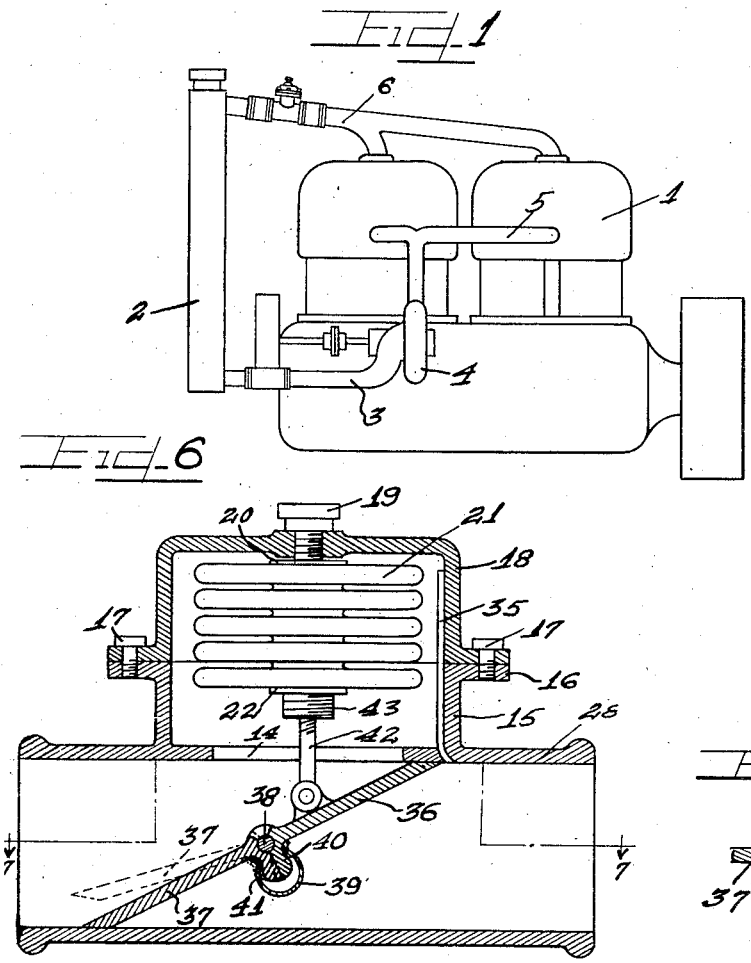
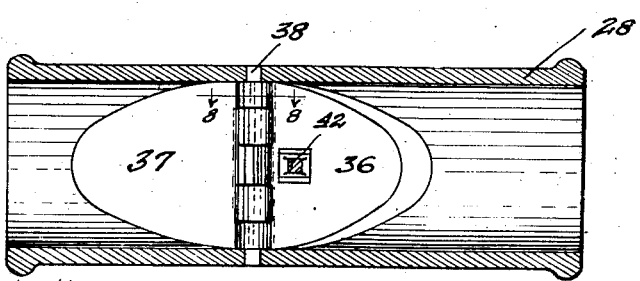
Inventor
FREDERICK PURDY
EDWARD A. ROSSOW

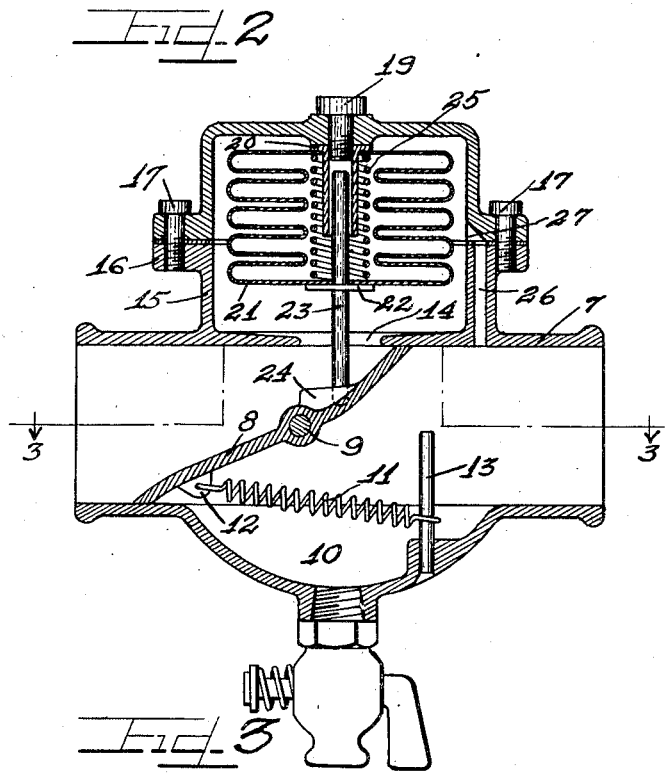
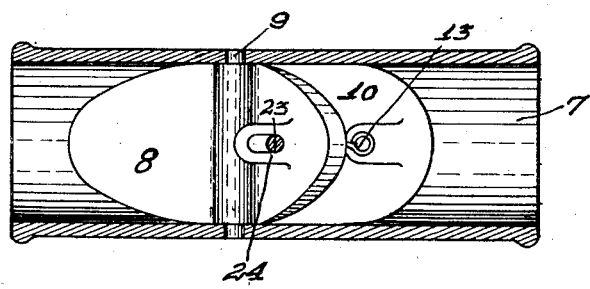

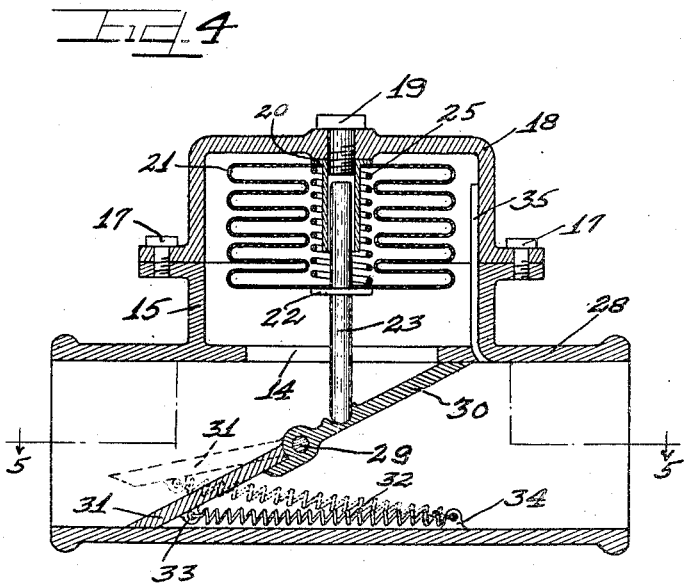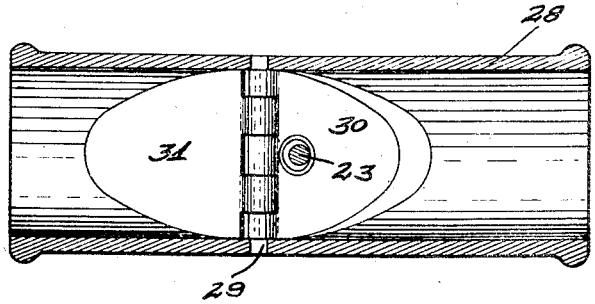

Patented Mar. 10, 1925.

1,528,786

UNITED STATES PATENT OFFICE.

FREDERICK PURDY AND EDWARD A. ROSSOW, OF CHICAGO, ILLINOIS, ASSIGNORS TO BENEKE MANUFACTURING COMPANY, OF CHICAGO, ILLINOIS, A CORPORATION OF ILLINOIS.

CONTROLLING MEANS FOR CIRCULATING SYSTEMS.

Application filed May 12, 1921. Serial No. 469,028.

*To all whom it may concern:*

Be it known that we, FREDERICK PURDY and EDWARD A. Rossow, citizens of the United States, and residents of the city of Chicago, in the county of Cook and State of Illinois, have invented certain new and useful Improvements in Controlling Means for Circulating Systems; and we do hereby declare that the following is a full, clear, and exact description of the same, reference being had to the accompanying drawings, and to the numerals of reference marked thereon, which form a part of this specification.

This invention relates to controlling means for circulating systems and particularly to thermostatically operated means for controlling the flow of a cooling fluid in the circulating system of an internal combustion engine.

Thermo-sensitive operating elements of the type preferably employed in circulating cooling systems ordinarily comprise a collapsible metallic vessel in which a volatile liquid is maintained under subatmospheric pressure at normal temperatures so that the vessel is collapsed at such temperatures. Upon a rise in temperature in the fluid surrounding the vessel the same becomes heated and the consequent vaporization of the liquid in the vessel causes an increase in pressure which effects the expansion thereof. This expansion of the thermo-sensitive element or vessel is utilized to operate a valve which controls the progress of fluid in the circulating system and in order that the vessel may be expanded to open the valve at the proper temperature it is, of course, necessary that the volatile liquid be sealed in the vessel under a definite subatmospheric pressure. Such a definite pressure may be accurately and conveniently attained but the external pressure of the fluid in the circulating system which is ordinarily produced by a pump therein is varied so much by variations in engine speed that the action of the thermostatic element is seriously impaired when subjected to such external pressure. Increases in pressure which are brought about by increases in engine speed are also liable to cause damage to the conduits or connections comprising the circulating system when the controlling valve is closed, and it is therefore desirable that means be provided to act in conjunction with the controlling valve to afford a relief for such excessive increases in pressure.

It is, of course, desirable that a construction be provided whereby the valve will be moved to a position of safety in case of failure of the thermostat, and also that the thermostat be easily removable for replacement and repair.

It is an object of this invention to provide thermostatically operated means for controlling the flow of fluid in a circulating system having means associated therewith for permitting a flow of fluid in case of excessive pressure and regardless of temperature.

It is another object of this invention to provide controlling means for a fluid circulating system adapted to be opened by a thermostat upon an increase in temperature of the fluid and to be closed by mechanical means upon a decrease in the fluid temperature.

It is a further object of this invention to provide a mechanically closed thermostatically operated controlling valve for circulating systems which is adapted to open to permit a flow of fluid in the system upon the occurrence of an excessive pressure therein or upon the failure of the thermostat.

It is an important object of this invention to provide an efficient and economical mechanism for controlling the flow of cooling fluid in the circulating system of an internal combustion engine to maintain the engine at the proper operating temperature.

Other and further important objects of this invention will be apparent from the disclosures in the specification and the accompanying drawings.

The invention (in a preferred form) is shown on the drawings and hereinafter more fully described.

On the drawings:

Figure 1 is a side elevation of an internal combustion engine equipped with the improved thermostatically controlled circulating cooling system of this invention.

Figure 2 is a central vertical section through a preferred form of thermostatically operated controlling mechanism, with parts in elevation.

Figure 3 is a section on the line 3—3 of Figure 2.

Figure 4 is a central vertical section through a slightly modified form of thermostatically operated controlling mechanism.

Figure 5 is a section on the line 5—5 of Figure 4.

Figure 6 is a central longitudinal vertical section through another form of thermostatically controlled operating mechanism constructed according to the principles of this invention.

Figure 7 is a section on the line 7—7 of Figure 6, and

Figure 8 is a fragmentary section on the line 8—8 of Figure 7.

As shown on the drawings:

The circulating system of this invention is particularly adapted for use in the cooling system of an internal combustion engine and on the drawings the internal combustion engine is represented in general by the reference numeral 1, the radiator thereof being represented by the reference numeral 2. Leading from the lower side of the radiator 2 is a conduit 3 which connects with a pump 4, the delivery side of which is connected by means of a conduit 5 with the cooling fluid chamber of the internal combustion engine. The fluid is conveyed outwardly from said chamber through a conduit 6 which connects in the upper end of the radiator 2 and interposed in said conduit 6 is the thermostatically operated controlling mechanism of this invention, which will now be described.

The preferred form of this mechanism is shown in Figures 2 and 3 wherein a chambered casing 7, which is interposed in the conduit 6 by means of rubber hose connections or in any other suitable manner, is provided with a valve 8 which controls the flow of fluid through said casing and is pivoted in the casing on a transverse rod or shaft 9. As will be noted from an examination of Figure 2, the lower portion of said valve 8 is longer than the upper portion thereof and is slightly concave toward a depression 10 which is formed in the lower part of the casing, a suitable manually closed drain aperture being provided in the casing at the bottom of said depression. The upper portion of said valve 8 is slightly convex toward the depression 10 and consequently the effective pressure exerted on the lower portion of the valve is considerably greater than the pressure exerted on the upper portion thereof. Said valve 8 is normally held closed by means of a light, helical spring 11 one end of which is secured to an apertured boss 12 thereon, and the other end of which is secured to a pin 13 extending upwardly into the interior of the casing. An opening 14 is formed in the casing above the upper portion of the valve 8 and surrounding said opening is an integral vertical annular wall 15 which is provided at its upper edge with an outwardly extending integral horizontal flange 16 having a plurality of threaded apertures.

Secured to said flange 16 by means of a plurality of machine screws 17 engaged in the threaded apertures therein is a chambered cap 18 which supports the thermosensitive operating element inside the chamber formed thereby and by the annular wall 15 in a manner which will now be described. Engaged through a threaded aperture in the center of the top of said cap 18 is a machine screw 19 which is engaged in and acts to support a flanged sleeve 20 on the inside of the chamber. Secured to said sleeve 20 and abutting the under side of the flange thereon is a collapsible metallic vessel 21 in which is sealed a volatile liquid, the sealing of the liquid in said vessel having been effected at such a temperature that the vessel remains collapsed due to the difference in internal and external pressure at all normal temperatures or the temperatures of the fluid when the engine is not running. Extending through the bottom of the collapsible vessel 21 and secured to said vessel by means of a plate 22 which is braced or otherwise secured to the vessel is a rod 23 one end of which extends upwardly through the interior of the vessel into the sleeve 20, and the other end of which extends downwardly through the opening 14 and rests in a recessed boss 24 formed on the upper side of the valve 8 above the shaft 9. Axially mounted on the inside of the vessel 21 is a helical spring 25 which surrounds the sleeve 20 and which engages both the top and the bottom of the vessel. Said spring 25 exerts a force tending to move the vessel 21 into expanded position and it is necessary that the volatile liquid be sealed in said vessel at such a temperature that the difference in internal and external pressure when the engine is cold is sufficient to maintain the vessel in collapsed position against the action of the spring.

The liquid in the circulating system flows through the casing 7 from right to left (referring to the drawings) and as a result of the construction above described it will be noted that the vessel 21 is isolated from the pressure of the fluid in the system. It is, of course, necessary that a certain amount of said fluid be introduced into the chamber in which the thermostatic vessel is contained in order that the temperature of the fluid may affect said vessel and in order to accomplish this a passage 26 is provided in the wall 15 the lower inside edge of the cap 18 being cut away at 27 to allow the liquid to enter.

A slight modification of the above described mechanism is shown in Figures 4 and 5 wherein the depression 10 in the bottom of the casing is omitted, said casing being represented in Figures 4 and 5 for purposes of convenience by the reference numeral 28. Pivotally mounted on a shaft 29 extending transversely of said casing 28 is a hinged valve which is capable of being moved as a unit about the shaft 29 by pressure on the upper portion 30 thereof, and the lower portion 31 of said valve is capable of separate movement to afford a relief for excessive pressure in the inside of the casing when the valve is closed. Said valve is normally held closed by means of a helical spring 32 one end of which is secured to an apertured boss 33 secured to the under side of the lower portion 31 and the other end of which is secured to an apertured boss 34 extending upwardly from the bottom of the casing 28. Said valve is opened by the thermostatically operated mechanism previously described and the connection between the valve and the thermostatic vessel is afforded by the engagement of the lower end of the rod 23 in a recess in the upper portion 30 of the valve.

It will be noted that in this construction the thermo-sensitive element is also isolated from the pressure of the fluid in the circulating system and a limited amount of the fluid is conducted to the interior of the chamber cap 18 by means of a small tube 35 extending from the pressure side of the valve to the interior of said cap.

In the modification of the mechanism of this invention shown in Figures 6, 7 and 8, the casing 28 and the previously described operating thermostat are employed and the controlling valve consists of hinged portions 36 and 37 which are rotatable as a whole about the transverse shaft 38, the lower portion 37 being also separately rotatable about said shaft to afford relief in cases of excessive pressure. Said lower portion 37 of the valve is normally held in alignment with the portion 36 by means of a leaf spring 39 which is engaged over bosses 40 and 41 formed on the lower sides of the valve portions 36 and 37 at their points of hinged connection. The connection between the thermostatic vessel and the controlling valve is afforded by a link 42 which is pivotally connected to the upper side of the valve portion 36 and the upper end of which is engaged in a threaded aperture in a boss 43 secured to and integral with the plate 22.

The operation is as follows:

The circulating system controlling mechanism of this invention will now be described in connection with the form of mechanism shown in Figures 2 and 3. When the engine is cold and the cooling fluid therein is at normal temperature, the vessel 21 is collapsed and the rod 23 is consequently moved into such position that the valve 8 is allowed to be moved into closed position by the spring 11. When the engine is started and the fluid in the circulating system attains a higher temperature, the heat therefrom is transmitted from the fluid which is allowed to enter the chamber containing the vessel 21 through the passage 26 and said vessel is consequently expanded to move the rod 23 downwardly to open the valve 8 against the tension of the spring 11 and allow a free circulation of the fluid in the circulating system. In case of damage to the thermo-sensitive element which results in an equalization of the internal and external pressure relative to the vessel 21, the spring 25 will act to expand the same and open the valve 8 against the tension of the spring 11, said spring 25 being designed to exert less force than the collapsible effect of the vessel but more force than the spring 11. In case of excessive pressure occasioned by a speeding up of the engine and a consequent speeding up of the pump 4 when the valve 8 is closed, the pressure on the bottom parts of said valve will act to open the same against the tension on the spring 11 and thus relieve excessive pressure of the fluid. This effect is greatly facilitated by the particular form of the valve 8, the lower half of said valve presenting a considerably greater effective pressure area than the upper portion thereof. The effect of this unequal pressure on the lower portion of the valve is enhanced by the provision of the depression 10 in the casing 7 and said depression also affords means whereby sufficient fluid is allowed to pass through the casing when the valve is moved into relieving position.

The operation of the machanism shown in Figures 4 and 5 is substantially the same as the operation just described in connection with Figures 2 and 3, the lower portion 31 of the valve opening against the tension of the spring 32 to afford relief in case of excessive pressure when the valve is closed.

In the construction shown in Figures 6, 7 and 8, the relief movement of the lower portion 37 of the valve is effected against the tension of the leaf spring 39 and in this construction the valve is held in closed position when the thermostat is collapsed because of the connection therewith afforded by the link 42.

It will be noted that the removal of the thermo-sensitive element or vessel in all of these constructions is a very simple matter, and in case of damage to said vessel it is only necessary to remove the machine screws 17 and lift the cap and the thermostatic vessel away from the remainder of the mechanism, replacing it by a similar cap or by a new thermostatic vessel as convenience may demand.

In the construction shown in Figures 6 and 7 the removal of the thermo-sensitive vessel is effected by removing the machine screws 17 and by rotating the cap 18 to unscrew the boss 43 from the upper end of the link 42.

It will thus be apparent that in all of the constructions of this invention, means are provided whereby the thermostatic element may be conveniently removed for replacement or repair, and also on account of this construction the assembly of the controlling mechanism in the process of manufacture may be very conveniently and economically effected.

On account of the fact that the collapsible vessel is isolated from the pressure of the fluid in the circulating system when the valve is closed, it is possible to so construct these vessels that they will accurately operate at a desired predetermined temperature and thus it is possible to maintain the engine at an efficient operating temperature.

The arrangement for relieving excessive pressure when the valve is closed insures against damage to the circulating system due to such excessive pressure and since the valve is in each case moved into open position in case of damage to the collapsible vessel, there is no danger of the system overheating due to accidents to the thermo-sensitive operating element.

We are aware that changes in construction may be made through a wide range without departing from the principles of our invention, and we therefore do not purpose limiting the patent granted otherwise than necessitated by the prior art.

We claim as our invention:

1. In a circulating system, means for circulating a fluid under pressure, a valve for controlling the flow of said fluid, a thermostat in the system directly operating said valve, and means separate from said thermostat tending to maintain said valve closed but adapted to yield to permit it to open either under excessive fluid pressure or through the action of said thermostat.

2. In a circulating system, means for circulating a fluid under pressure, a thermostat in the system, a valve for controlling the flow of fluid in the system and acting when in closed position to isolate the thermostat from the pressure of the fluid therein, and means separate from the thermostat tending to maintain the valve in closed position and adapted to permit the valve to yield to be moved into open position under excessive fluid pressure or by action of the thermostat.

3. In a circulating system, means for circulating a fluid under pressure, a thermostat in the system, a valve for controlling the flow of fluid in the system and acting when in closed position to isolate the thermostat from the pressure of the fluid therein, means separate from the thermostat tending to maintain the valve in closed position and adapted to yield to permit the valve to be moved into open position by excessive fluid pressure or by action of the thermostat, and means connected to the thermostat adapted to open the valve in case of failure of the thermostat.

4. In a circulating system, means for circulating a fluid under pressure, a curved unbalanced valve in the system normally maintained closed but adapted to open under excessive pressure, and separate means for opening the valve upon a rise in temperature of the fluid.

5. In a circulating system, means for circulating a fluid under pressure, a valve in the system, means for maintaining the valve in closed position against normal pressures in the system, means for opening the valve upon a rise in temperature of the fluid, and separate means for automatically opening the valve in case of failure of said second mentioned means.

6. In a circulating system, means for circulating a fluid under pressure, a valve in the system tending to be moved into open position by the fluid pressure, resilient means for maintaining the valve in closed position, thermo-sensitive means for opening the valve against the action of the resilient means, and additional resilient means for opening the valve in case of failure of the thermo-sensitive means.

7. In a circulating system, means for circulating a fluid under pressure, a valve in the system tending to be moved into open position by the fluid pressure, resilient means for maintaining the valve in closed position, thermo-sensitive means isolated from the pressure of the fluid in the system when the valve is closed and acting to open the valve against the action of said resilient means upon an increase in temperature, and additional resilient means for opening the valve in case of failure of the thermostat.

In testimony whereof we have hereunto subscribed our names in the presence of two subscribing witnesses.

FREDERICK PURDY.
EDWARD A. ROSSOW.

Witnesses:
CARLTON HILL,
CHARLES W. HILLS, Jr.